Patented Aug. 7, 1945

2,381,694

UNITED STATES PATENT OFFICE 2,381,694

RUBBER DERIVATIVE COMPOSITION

Paul H. Scrutchfield, Wilmington, Del., assignor to Hercules Powder Company, Wilmington, Del., a corporation of Delaware No Drawing. Application March 1, 1941,
Serial No. 381,400

1 Claim. (Cl. 117—146)

This invention relates to stabilized chlorine-containing rubber derivatives such as chlorinated rubber.

Heretofore, chlorine-containing rubber derivatives have been objectionable because they are subject to deterioration upon subjection to heat, ultraviolet light and the like with consequent decomposition forming small amounts of free hydrochloric acid which is corrosive to metals and which decomposes organic materials such as cellulosic materials. Various attempts have been made to produce a chlorinated rubber which is stable to such deterioration but as far as I have been able to determine, none of these attempts have been entirely satisfactory either because of the expense of the stabilization procedure or because of the ineffectiveness of the stabilization treatment.

It is an object of the present invention to provide an improved stabilized chlorine-containing rubber derivative.

Another object is to provide an improved stabilized chlorinated rubber.

Another object is to provide an improved coating for transparent wrapping sheeting.

Another object is to provide an improved rubber derivative molding powder.

Other objects will more fully hereinafter appear.

I have discovered that chlorine-containing rubber derivatives such as chlorinated rubber may be effectively stabilized by the incorporation therewith of a small amount of a light metal naphthenate. Thus, I may employ the naphthenates of the light metals of Demings' Periodic Table including the naphthenates of the alkali metals such as sodium, potassium, and lithium or of the alkaline earth metals such as calcium, strontium, barium, and magnesium. While the naphthenates of the less common light metals such as beryllium, rubidium, or caesium may be used, they are not preferred because of their unduly high cost.

The naphthenic acid which is combined with the light metal is preferably the commercially available product comprising a mixture of polycyclic acids such as hexahydro benzoic acid and other related acids. Commercial naphthenic acid is obtained by the extraction of the naturally occurring naphthenic acids present in certain crude petroleums.

Examples of light metal naphthenates which had been found to be very satisfactory as stabilizers for chlorinated rubber or the like are: magnesium naphthenate, calcium naphthenate, barium naphthenate, potassium naphthenate, and sodium naphthenate. The amount of light metal naphthenate employed in accordance with the present invention may vary within wide limits depending upon the particular stabilizer used, the type of chlorinated rubber, and upon the presence or absence of other materials which act as stabilizers for the chlorinated rubber or interfere with the stabilizing action. The optimum concentration will also depend upon the viscosity of the chlorinated rubber. Thus low viscosity types have higher acidities than high viscosity types and therefore will require a large amount of stabilizer. In general, however, the amount of light metal naphthenate employed will range between about 0.1% and about 25% by weight based on the weight of chlorinated rubber or the like. A preferred proportion is from about 2% to about 5% by weight based on the weight of chlorinated rubber.

The light metal naphthenate stabilizer may be incorporated into the chlorinated rubber composition in any of a number of different ways which will be obvious to those skilled in the art. For example, the naphthenate and the chlorinated rubber may be combined by the expedient of grinding them together or by the use of a mutual solvent. The stabilizer may be incorporated in the chlorinated rubber in advance of the formulation thereof into a plastic or coating composition, or may be incorporated as an ingredient at the time of formulation of such a composition.

In addition to chlorinated rubber and the stabilizer, the composition may comprise other conventional ingredients which are commonly used in plastic and liquid coating compositions such as plasticizers, resins, pigments, fillers, dyes, solvents, diluents and thinners, etc.

The invention is particularly applicable to chlorinated rubber compositions which are employed for the coating of cellulosic articles. Thus, stabilized chlorinated rubber may be employed with advantage in the preparation of clear, unpigmented lacquers used in the coating of transparent regenerated cellulose wrapping sheeting such as is sold under the trade name "Cellophane," or similar transparent cellulosic wrapping material.

The following table shows the solubility of various light metal naphthenates in several solvents which are commonly used in the formulation of chlorinated rubber compositions. This solubility was determined by attempting to dissolve ½ g. of the stabilizer in 40 g. of the particular solvent. "S" indicates that the stabilizer completely dissolved. The table also shows the effect of the stabilizer in preventing degradation of cellulose. This stabilizing effect was determined as follows: Sheets of cotton linters were impregnated with chlorinated rubber solutions containing 5% of the light metal naphthenates based on the weight of chlorinated rubber, under uniform impregnating conditions. The sheets were dried at room temperature for 24 hours whereupon they were placed under glass and subjected to the ultraviolet radiation of a "Uvi" mercury arc for 6 hours. The sheets were then thoroughly washed with solvent to remove all traces of chlorinated rubber. After drying, the viscosity of the resulting sheets was determined in full concentration (5%) in cuprammonia solution. A sheet of linters was radiated and washed with solvent and its viscosity determined in the same manner as the impregnated sheets, this sheet being termed the blank. The figures in the table under the heading "Cuprammonia viscosity of treated cellulose" give the cuprammonia viscosity of the impregnated sheets expressed as per cent of the cuprammonia viscosity of the unimpregnated blank, and are inversely proportional to cellulose degradation.

| Amount of stabilizer, percent | Stabilizer employed | Solubility of stabilizer | | | Cuprammonia viscosity of treated cellulose, percent of blank |
|---|---|---|---|---|---|
| | | Toluene | CCl₄ | Butyl acetate | |
| 0 | (None-straight chlorinated rubber-comparative run) | | | | 58.3 |
| 5 | Magnesium naphthenate | S | S | S | 95.5 |
| 5 | Calcium naphthenate | S | S | S | 104.5 |
| 5 | Barium naphthenate | S | S | S | 109 |
| 5 | Potassium naphthenate | S | S | S | |
| 5 | Sodium naphthenate | S | S | S | |

Preferably the light metal naphthenate is used in an amount sufficient to give a cuprammonia viscosity of cellulose in accordance with the foregoing test of at least 75% of the cuprammonia viscosity of the unimpregnated blank.

The stabilizers of the present invention are very effective when used in chlorinated rubber molding powders which in the past have caused difficulty with corrosion of the molding equipment as a result of liberation of hydrochloric acid under heat.

The molding powder may embody chlorinated rubber, a plasticizer and the stabilizer in the form of discrete particles of suitable size. If desired, fillers, pigments, resins, etc. may also be present.

A convenient test for determining the degree of stability of molding powders prepared in accordance with the present invention is as follows: Two grams of the molding powder are placed in a test tube. A piece of Congo red paper is suspended above the molding powder so that its lower edge is one inch above the surface of the molding powder. The tube is then placed in a constant temperature bath at 135° C. and the time noted for the color of the Congo red paper to change to blue. In this test a molding powder made exactly as in Examples 3 and 4 below except omitting the stabilizer gave a time of three minutes, whereas molding powders stabilized in accordance with the present invention gave times from 90 minutes to 500 minutes.

The invention is particularly applicable to compositions free from or essentially free from drying components, that is components which dry by oxidation such as drying oils, drying oil fatty acid modified synthetic resins, and the like. In the past such compositions have given extreme difficulty because of liberation of acid.

Below are given non-limiting specific examples of the invention.

*Example 1*

A typical, clear unpigmented lacquer composition employing the light metal naphthenates as stabilizers was as follows:

| | Parts by weight |
|---|---|
| Chlorinated rubber | 20 |
| Dibutyl phthalate | 4 |
| Xylene | 75 |
| Light metal naphthenate | 0.6 |

*Example 2*

A typical pigmented lacquer formulation was as follows:

| | Parts by weight |
|---|---|
| Chlorinated rubber | 20 |
| Dibutyl phthalate | 4 |
| Zinc Oxide | 10 |
| Titanium Dioxide | 5 |
| Xylene | 75 |
| Stabilizer | 3 to 5 |

Exposure tests using the light metal naphthenates in the formulations of Examples 1 and 2 showed a fence life of from 3 to 8 times as long as that for identical formulations using unstabilized chlorinated rubber. The pigmented formulations of Example 2 showed an improvement in durability although the difference was not as marked as in the case of the clear films.

*Example 3*

A molding powder was made with the following formulation:

| | Parts by weight |
|---|---|
| Chlorinated rubber (5000 centipoise type) | 100 |
| Tricresyl phosphate | 30 |
| Sodium naphthenate | 1 |

These ingredients together with 71.5 parts of a 7 to 3 acetone-hexane mixture were mixed together to yield a paste, the volatile solvent removed by rolling on the two roll mill at 135–150° F. to yield a sheeted plastic which was then broken into particles of a convenient size for use as a molding powder. The product took 90 minutes to change the color of Congo red test paper to blue in accordance with the Congo red stability test outlined above. Molding by compression in contact with a steel disk gave a very slight corrosion of the disk.

*Example 4*

Example 3 was duplicated exactly except that five (5) parts of the sodium naphthenate were used instead of one. The product gave a test period of 480 minutes in the Congo red stability test. The slight corrosive effect noted in connection with the molding powder of Example 3 was entirely eliminated.

From the foregoing, it will be seen that the light metal naphthenates markedly increase the stability of chlorinated rubber and the like and therefore are extremely advantageous in the fields where chlorinated rubber or the like is employed.

The invention is applicable not only to the stabilization of chlorinated rubber but also of rubber hydrochloride and chlorinated rubber hydrochloride.

The use of the naphthenates broadly and of the heavy metal naphthenates specifically is covered in the copending application of Lorand and Scrutchfield, Serial No. 381,401, filed of even date herewith.

It will be understood that the details and examples hereinbefore set forth are illustrative only and that the invention as broadly described and claimed is in no way limited thereby.

What I claim and desire to protect by Letters Patent is:

As a new article of manufacture, transparent regenerated cellulose wrapping sheeting carrying a clear unpigmented film comprising chlorinated rubber, and, as a stabilizer for said chlorinated rubber from about 0.1% to about 25% by weight of a light metal naphthenate.

PAUL H. SCRUTCHFIELD.